United States Patent
Breau et al.

(10) Patent No.: US 8,675,661 B1
(45) Date of Patent: *Mar. 18, 2014

(54) ALLOCATING IP VERSION FIELDS TO INCREASE ADDRESS SPACE

(75) Inventors: Jeremy R. Breau, Kansas City, MO (US); John H. Bennett, III, Lawrence, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/633,571

(22) Filed: Dec. 8, 2009

Related U.S. Application Data

(63) Continuation-in-part of application No. 12/437,300, filed on May 7, 2009, now Pat. No. 8,107,475.

(51) Int. Cl.
*H04L 12/28* (2006.01)
*G06F 15/177* (2006.01)

(52) U.S. Cl.
USPC ........ 370/393; 370/389; 370/392; 370/395.5; 709/220; 709/222

(58) Field of Classification Search
None
See application file for complete search history.

(56) References Cited

U.S. PATENT DOCUMENTS

| | | | |
|---|---|---|---|
| 6,697,354 B1 * | 2/2004 | Borella et al. | 370/352 |
| 7,474,675 B2 * | 1/2009 | Park et al. | 370/469 |
| 7,606,191 B1 * | 10/2009 | Breau et al. | 370/328 |
| 7,864,780 B1 * | 1/2011 | Satapati | 370/395.54 |
| 7,970,765 B1 | 6/2011 | Olsen et al. | |
| 8,059,643 B1 * | 11/2011 | Shojayi et al. | 370/389 |
| 8,107,475 B1 * | 1/2012 | Shojayi et al. | 370/392 |
| 8,151,325 B1 * | 4/2012 | Bennett et al. | 726/4 |
| 8,250,189 B1 * | 8/2012 | Breau et al. | 709/222 |
| 8,335,210 B1 * | 12/2012 | Breau et al. | 370/352 |
| 8,358,648 B1 * | 1/2013 | Breau et al. | 370/352 |
| 8,478,891 B1 * | 7/2013 | Breau et al. | 709/233 |
| 2001/0040895 A1 * | 11/2001 | Templin | 370/466 |
| 2004/0052257 A1 * | 3/2004 | Abdo et al. | 370/392 |
| 2004/0068589 A1 * | 4/2004 | Witkowski et al. | 709/249 |
| 2005/0175010 A1 * | 8/2005 | Wilson et al. | 370/392 |

(Continued)

OTHER PUBLICATIONS

Bush et al. The A+P Approach to the IPv4 Address Shortage draft-ymbk-aplusp-03 (Mar. 2009).*

(Continued)

*Primary Examiner* — Marsha D Banks Harold
*Assistant Examiner* — Christopher Wyllie

(57) ABSTRACT

Computer systems, computer-readable media, and computerized methods for assigning network identifiers in a network are provided. A dynamic host configuration protocol (DHCP) server is employed to allocate various fractional IP addresses that include a common IPv4 address paired with a value of an IP version field within a data packet, wherein the value is selected from a plurality of available values. In order to differentiate between fractional IP addresses that share a common IPv4 address, a particular value of the IP version field is selected by the DHCP server and assigned to a client device when that particular value is not currently or previously assigned to another client device. Upon assignment to the client device, a fractional IP address that includes the common IPv4 address together with the particular value of the IP version field uniquely identifies the client device as a destination of a data packet within the network.

14 Claims, 5 Drawing Sheets

(56) References Cited

U.S. PATENT DOCUMENTS

| | | | |
|---|---|---|---|
| 2005/0195832 A1* | 9/2005 | Dharmapurikar et al. | 370/395.31 |
| 2006/0083262 A1* | 4/2006 | Bhatia et al. | 370/466 |
| 2006/0165062 A1* | 7/2006 | Nishida et al. | 370/352 |
| 2006/0227792 A1* | 10/2006 | Wetterwald et al. | 370/395.52 |
| 2007/0091862 A1* | 4/2007 | Ioannidis | 370/338 |
| 2007/0094411 A1* | 4/2007 | Mullane et al. | 709/245 |
| 2007/0130427 A1* | 6/2007 | Lahti et al. | 711/133 |
| 2008/0059464 A1* | 3/2008 | Law et al. | 707/6 |
| 2008/0080496 A1* | 4/2008 | Slaight | 370/389 |
| 2008/0181216 A1* | 7/2008 | Breau et al. | 370/389 |
| 2008/0244102 A1* | 10/2008 | Mochizuki | 710/9 |
| 2008/0253382 A1* | 10/2008 | Bachmann et al. | 370/400 |
| 2009/0106404 A1* | 4/2009 | Christenson | 709/222 |
| 2009/0304026 A1* | 12/2009 | Hamada | 370/466 |
| 2009/0320087 A1 | 12/2009 | Song et al. | |
| 2010/0005158 A1* | 1/2010 | Savolainen | 709/220 |

OTHER PUBLICATIONS

Bush et al. (The A+P Approach to the IPv4 Address Shortage draft-ymbk-aplusp-03 (Mar. 2009)).*

Bush et al. (the A+P Approach to the IPv4 Address Shortage draft-ymbk-aplusp-03 (Mar. 2009).*

Notice of Allowance and Fees Due in U.S. Appl. No. 12/437,300 mailed Oct. 3, 2011, 10 page.

U.S. Appl. No. 12/437,300, "Method and Procedure for Increasing IPv4 Address Space," filed May 7, 2009.

Office Action mailed Mar. 22, 2011 in U.S. Appl. No. 12/437,300, 25 pages.

"Reverse DNS Lookup", retrieved Apr. 16, 2010, 3 pages, http://en.wikipedia.org/wiki/Reverse_DNS_Lookup.

"Domain Name System", retrieved Apr. 16, 2010, 15 pages, http://en.wikipedia.org/wiki/Domain_Name_System.

"AX Series: IPv4 & IPv6 Dual Stack", 2005, A10 Networks, 3 pages, http://www.a10networks.com/products/axseries-ipv.php.

Durand, Alain, "Sharing a Single IPv4 Address Among Many Broadband Customers", pp. 1-9, http://www.nanog.org/mtg-0710/presentations/Durand-lightning.pdf.

"IPV4 Address Exhaustion", 7 pages, May 7, 2009, http://en.wikipedia.org/wiki/IPv4_address_exhaustion.

"Network Address Translation", 10 pages, May 4, 2009, http://en.wikipedia.org/wiki/Network_address_translation.

Iljitsch Van Beijnum, "IPv4 Address Consumption", 2009, 5 pages, The Internet Protocol Journal, vol. 10, No. 3., http://www.cisco.com/web/about/ac123/ac147/archived_issues/ipj_10-3/103_addr-cons.html.

"Classless and Subnet Address Extensions", http://triton.towson.edu/~rhammell/Ait622/Chap09_post.ppt#370,1, Classless.

Notice of Allowance and Fees Due mailed Apr. 12, 2012 in U.S. Appl. No. 12/693,793, 18 pages.

Preinterview First Action Interview mailed Oct. 24, 2012 in U.S. Appl. No. 12/780,142; 20 pages.

First Action Interview Office Action mailed Aug. 23, 2013 in U.S. Appl. No. 12/780,142; 13 pages (SPRI.153873).

* cited by examiner

| +            | Bits 0-3 | 4-7           | 8-15                                | 16-18 | 19-31           |
|--------------|----------|---------------|-------------------------------------|-------|-----------------|
| 0            | Version  | Header length | Type of Service (now DiffServ and ECN) | Total Length          ||
| 32           | Identification                                         ||| Flags | Fragment Offset |
| 64           | Time to Live            || Protocol                   | Header Checksum       ||
| 96           | Source Address                                                                ||||
| 128          | Destination Address                                                           ||||
| 160          | Options                                                                       ||||
| 160 or 192+  | Data                                                                          ||||

*FIG. 1.*
*(Prior art)*

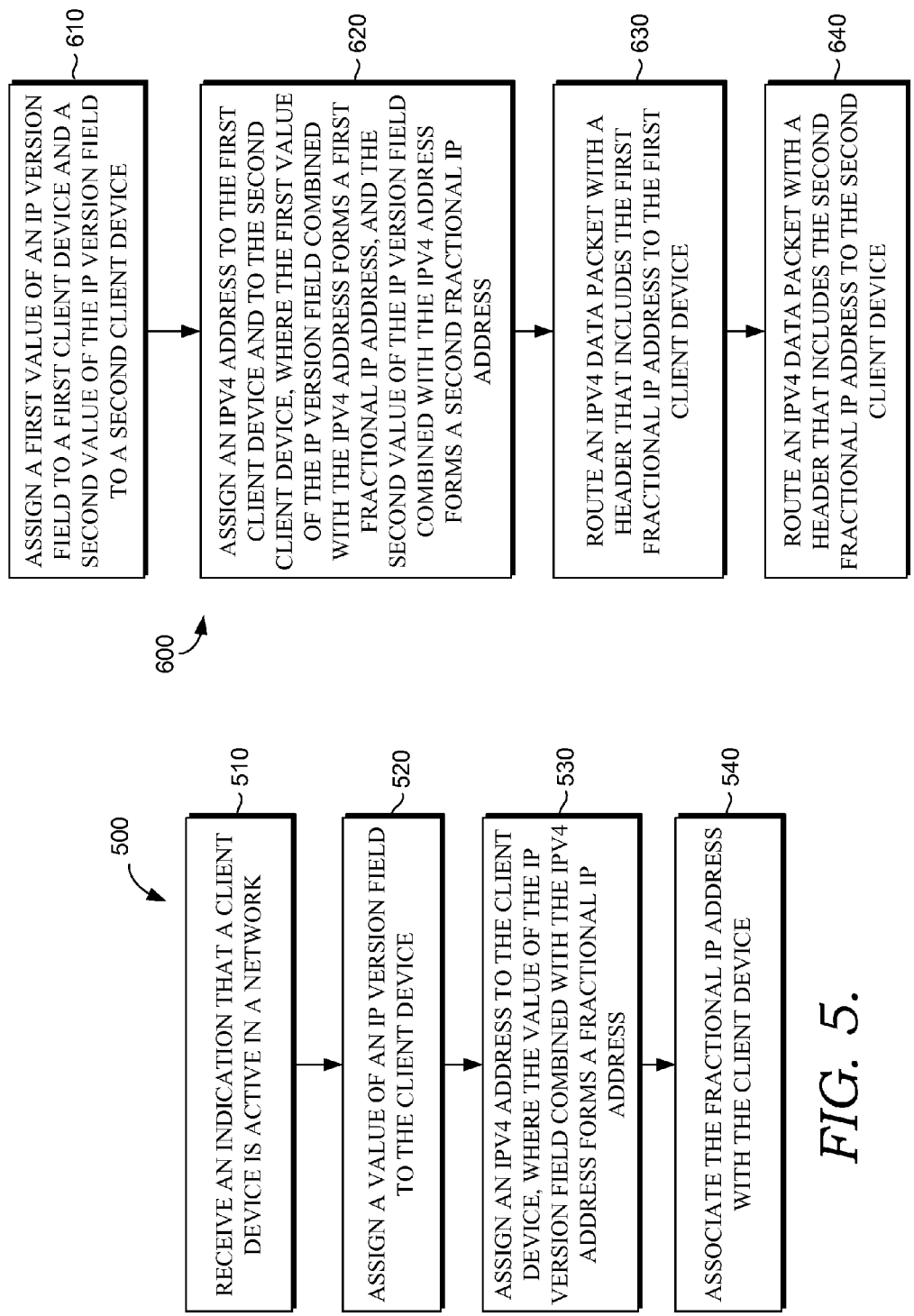

ALLOCATING IP VERSION FIELDS TO INCREASE ADDRESS SPACE

CROSS-REFERENCE TO RELATED APPLICATIONS

This application is a continuation-in-part of prior U.S. application Ser. No. 12/437,300 filed May 7, 2009, entitled "METHOD AND PROCEDURE FOR INCREASING IPV4 ADDRESS SPACE," the teachings of which are hereby incorporated by reference in their entirety.

BACKGROUND

Communication among computing devices typically occurs through networks. For computing devices in a wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate to systems and methods for assigning unique network identifiers in a wired or a wireless network. The systems and methods facilitate assigning a unique network identifier (fractional IP address), which typically include an IPv4 address and a particular value of an IP version field, to a client device that is active on the network. As used herein, the "fractional" IP address represents a specific unique network identifier that is composed of, in part, the IPv4 address assigned to the client device along with a portion, or fraction, of a header used in addressing data packets. In an exemplary embodiment, the fraction of the header is a value entered into an IP version field, such as one of IPv0-Ipv4. Utilizing this version-based, fractional IP address allows for the assignment of many fractional IP addresses, which are unique amongst themselves, to multiple client devices that are active on the same network and that are using the same IPv4 address. Because each fractional IP address includes one of various available values of the IP version field in addition to the IPv4 address, the usefulness of a single IPv4 address is extended from one client device to multiple client devices.

Aspects of the present invention relate to a computer system for assigning network identifiers to client devices that are active in a wired or wireless network. Initially, the computer system includes a dynamic host configuration protocol (DHCP) server, a first client device, a second client device, where the first client device and the second client device are typically active in the wired or wireless network. In an exemplary embodiment, the DHCP server may allocate a first fractional IP address including an IPv4 address and a first value of an IP version field. The DHCP server may further assign the first fractional IP address to the first client device upon an occurrence of an event, such as detecting that the first client device is active in the network or receiving a request from the first client device for a network identifier. In the instance where the second client device is instructed to send an IPv4 data packet to the first client device, the second client device may incorporate the first fractional IP address within a header of the IPv4 data packet and may transmit the first IPv4 data packet over the network. Computing devices within the network, or routers between networks, may identify the first client device as a destination of the IPv4 data packet based on, or as a function of, the first fractional IP address carried therein. As such, aspects of the present invention allow the limited number of IPv4 addresses to expand to a number that is more sustainable for a wireless carrier that supports a multitude of "always on" devices. Further, although some of the components discussed above are typically associated with a packet-switched, wired network, it should be understood and appreciated that the methodology described herein for enlarging the available unique IP addresses in an IPv4 construct can be implemented by mechanisms within a wireless network or other communications architecture as well.

BRIEF DESCRIPTION OF THE SEVERAL VIEWS OF THE DRAWINGS

The present invention is described in detail below with reference to the attached drawing figures, wherein:

FIG. 1 illustrates an exemplary IPv4 header known in the prior art;

FIG. 5 is a flow chart of an exemplary method for assigning network identifiers to client devices in a network, in accordance with an embodiment of the present invention; and FIG. 6 is a flow chart of an exemplary method for assigning network identifiers to client devices in a network, in accordance with an embodiment of the present invention.

DETAILED DESCRIPTION

Figure 2:
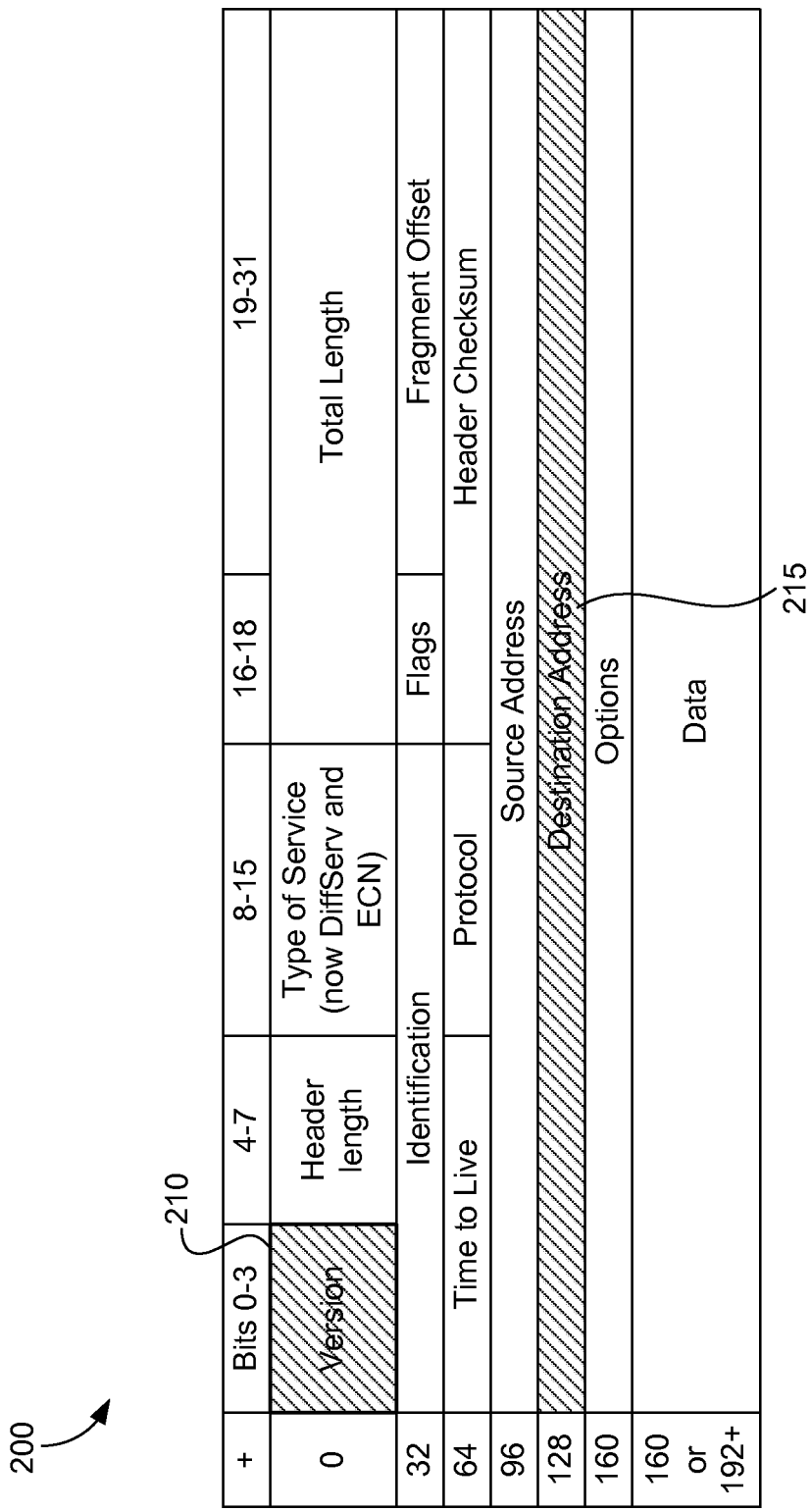
FIG. 2 illustrates an exemplary IPv4 header with a varying IP version field in accordance with an implementation of an embodiment of the invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the terms "step" and/or "block" or "component" might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| IP | Internet Protocol |
| IPv | Internet Protocol Version |
| LAN | Local Access Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |
| WAP | Wireless Application Protocol |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention relate to systems and methods for assigning unique network identifiers in a packet-switched wired network or in a wireless network. In these networks, information is divided into packets and routed to a destination. Internet protocol (IP) is the predominant packet-switching protocol, which enables delivery of packets from a source device to a destination device. In order for a data packet to successfully complete the journey from source to destination, each source and destination device must have a unique network identifier. Currently, each network device in a wired or wireless network is assigned an IP address as a unique network identifier. IP addresses can be assigned manually, assigned automatically through a dynamic host configuration protocol (DHCP) server, or assigned via other protocols or methods.

When employing a DHCP server, the DHCP server receives client requests for IP addresses and assigns IP addresses. When the DHCP server responds to a particular client request for an IP address by assigning a client device an IP address, the assignment is detected and the IP address that is assigned to the client device (e.g., physical network device) is written to one or more storage locations, such as a router table. In networks using address resolution protocol (ARP), a device, such as a router, stores the IP address in association with the client device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and potentially reduce the concern of IPv4 address exhaustion, implementation of IPv6 requires a significant software and hardware investment.

Accordingly, embodiments of the invention relate to assigning a unique network identifier, including an IPv4 address viewed in conjunction with a value of the IP version field, to a network device in a wired or wireless network. The systems and methods described herein make use of currently unused values of the IP version field (e.g., legacy IP versions IPv0, IPv1, IPv2, and IPv3, or potential IP versions IPv7, IPv8, etc.) and allow one IP address to be assigned to potentially multiple network devices, thus providing an immediate, cost-effective solution to IPv4 exhaustion.

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Some of these technologies are referred to as computer-storage media.

Embodiments of the present invention provide systems, methods, and computer-readable media for routing IPv4 packets based on a variation in a field in a header of the IPv4 packets. Currently, IPv4 packets are transmitted to a destination based on a destination address value in a destination address field in the IPv4 header. Another piece of information that is included in the IPv4 header is the version field. However, the version field of the IPv4 header is not currently used as a component of an IPv4 header for routing the IPv4 packets. That is, the variance of the version field in the IPv4 header is not used as a way of distinguishing destination addresses for IPv4 packets.

The present invention provides systems and methods for varying a version field in a header in an IPv4 packet as a means of increasing the number of IPv4 addresses available. By utilizing a new field for variance, the information used in the destination address field may repeat current IPv4 header information and be used in conjunction with a new IPv4 version field to create distinctions in the IPv4 header. In order to implement embodiments of the present invention, the current software used in many routers, which disregards an IP version field of a IPv4 header, may be adjusted or provided with logic to recognize the IP version field of the IPv4 header as a means of routing data packets.

Turning now to FIGS. 1 and 2, an exemplary IPv4 header 100 known in the prior art is shown in FIG. 1 and an exemplary IPv4 header 200 with a varying protocol version field is shown in FIG. 2, in accordance with embodiments of the invention. Initially, the IPv4 header 200 of FIG. 2 comprises a version field 210 with four bits and a destination address field 215. In embodiments of the invention, both the version field 210 and destination address field 215 may be used together to distinguish an IPv4 routing address, where an IPv4 routing address may have a version value and a destination address value.

Figure 3:
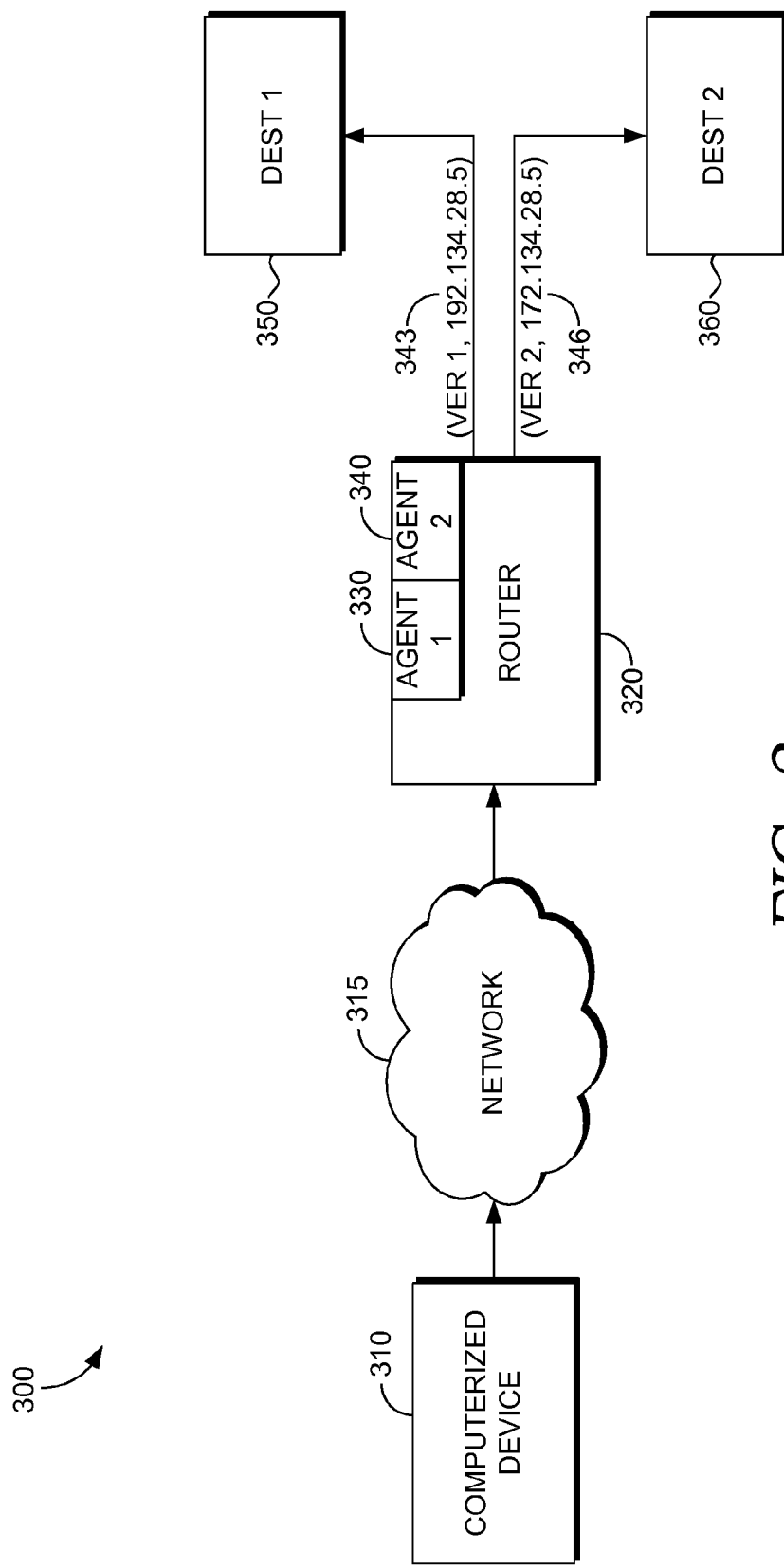
FIG. 3 provides a block diagram of an illustration of a computerized system for routing IPv4 data packets based on a variation in an IP version field in a header of the IPv4 packets.

With reference to FIG. 3, a computerized system 300 is shown that provides tangible and intangible elements for routing IPv4 data packets based on a variation in an IP version field in a header of the IPv4 packets, in accordance with an embodiment of the invention. As shown in FIG. 3, the exemplary system 300 includes a computerized device 310, a network 315, a router 320, an agent 330, an agent 340, a first routing address 343, second routing address 346, a first destination 350, and a second destination 360.

The computerized device 310 can be any computing device that is capable exchanging IPv4 data packets. In embodiments, computerized device 310 might be any computing device that can request, receive, and present web-based content. As such, computerized device 310 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, computerized device 310 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display, a power source (e.g., a battery), a data store, a speaker, a memory, a buffer, and the like.

The network 315 can be wired, wireless, or both. Further, the network 315 can be combined into a single network or can include multiple networks, as well as being a network of networks, but is shown in more simple form so as to not obscure other aspects of the present invention. For example, the network 315 may include one or more wide area networks (WANs), one or more local area networks (LANs), one or more public networks, such as the Internet, and/or one or more private networks. The network 315 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one ordinarily skilled in the art will appreciate that network 315 can enable communication between any number of user devices using, for example, Wireless Access Protocol (WAP).

The computerized device 310 may generate a first IPv4 data packet and a second IPv4 data packet. The first IPv4 data packet may have a routing address 343 of (version 1, 192.134.28.5) and the second IPv4 data packet may have a routing address 346 of (version 2, 192.134.28.5), wherein a routing address comprises a version value and a destination address value, both from the data in the fields of a first IPv4 packet and the second IPv4 packet, respectively. The first IPv4 packet may include a first version value and a first destination address value in the field in the header of the first IPv4 data packet. The second IPv4 packet may include a second version value and a second destination address value in the field in the header of the second IPv4 data packet. The first and second IPv4 packets may be transmitted over a network 315, where they may be intercepted by a router 320. Router 320 may receive the first and second IPv4 data packets, wherein the first version value in the field in the header of the first IPv4 data packet differs from the second version value in the field in the header of the second IPv4 data packet. Agent 330 at router 320 may send the first IPv4 data packet to a first destination 350 based on the first version value and the first destination address value in the first IPv4 data packet. Additionally, agent 340 at the router may send the second IPv4 data packet to a second destination 360 based on the second version value and the second destination address value in the second IPv4 data packet. Although FIG. 3 shows both agents 330 and 340, an implementation of an embodiment can have router 320 with only one agent that can route all types of IPv4 packets.

Figure 4:
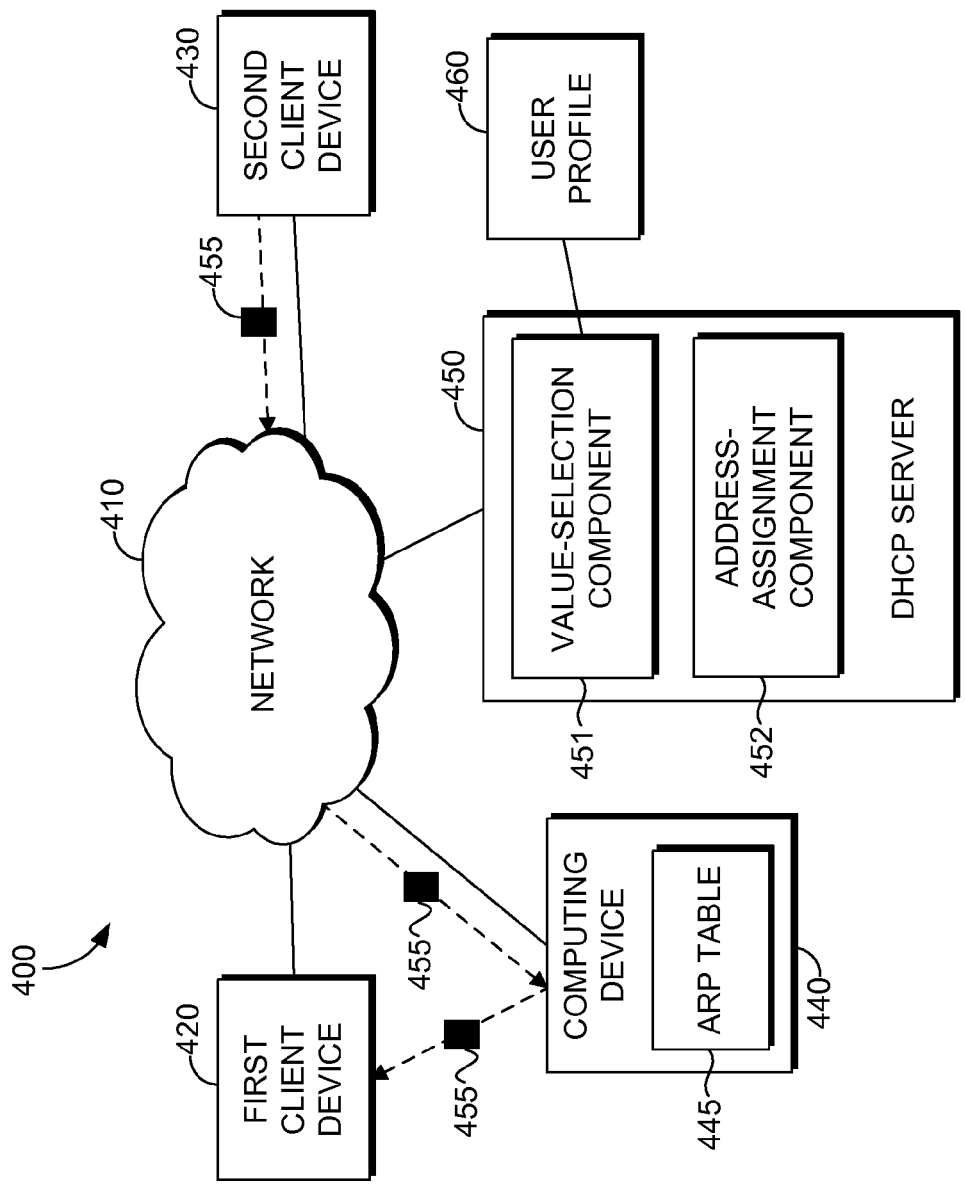
FIG. 4 is a block diagram illustrating an exemplary system architecture suitable for use in implementing embodiments of the present invention.

Turning now to FIG. 4, a block diagram illustrating an exemplary system architecture 400 suitable for use in implementing embodiments of the present invention is shown. In embodiments, the system architecture 400 is generally configured to assign network identifiers to client devices 420 and 430, and others, that are active in a network 410. As depicted, the system architecture 400 includes the client devices 420 and 430, a computing device 440, a DHCP server 450 that hosts a value-selection component 451 and an address-assignment component 452, and a user profile 460.

This exemplary system architecture 400 is but one example of a suitable environment that may be implemented to carry out aspects of the present invention, and is not intended to suggest any limitation as to the scope of use or functionality of the invention. Neither should the illustrated exemplary system architecture 400 be interpreted as having any dependency or requirement relating to any one or combination of the components 451 and 452 as illustrated. In some embodiments, one or more of the components 451 and 452 may be implemented as stand-alone devices. In other embodiments, one or more of the components 451 and 452 may be integrated directly into the computing device 440 or the client devices 420 and 430. It will be understood by those of ordinary skill in the art that the components 451 and 452 illustrated in FIG. 4 are exemplary in nature and in number and should not be construed as limiting.

Accordingly, any number of components may be employed to achieve the desired functionality within the scope of embodiments of the present invention. Although the various components of FIG. 4 are shown with lines for the sake of clarity, in reality, delineating various components is not so clear, and metaphorically, the lines would more accurately be grey or fuzzy. Further, although some features of FIG. 4 are depicted as single blocks, the depictions are exemplary in nature and in number and are not to be construed as limiting (e.g., although only two client devices 420 and 430 are shown, many more may be communicatively coupled to the DHCP server 450).

In embodiments, the DHCP server 450 is generally configured to allocate a first fractional IP address (including an IPv4 address and a first value of an IP version field), to allocate a second fractional IP address (including the IPv4 address and a second value of the IP version field), and to assign the first fractional IP address to the first client device 420 and the second fractional IP address to the second client device 430. Typically, an ARP table 445 stores, at least temporarily, the assigned first fractional IP address in association with the first client device 420 and the assigned second fractional IP address in association with the second client device 430. In embodiments, the computing device 440 can access and read the ARP table 445 upon receiving a data packet, compare a fractional IP address in a header of the data packet with entries in the ARP table 445, and direct transmission of the data packet within the network 410 based on the fractional IP address. In one instance, when traffic between the first client device 420 and the second client device 430 travels outside a local network or between partitioned networks, the computing device 440 may be embodied as a router that refers to the ARP table 445 or a routing table (having fractional IP addresses stored thereon) to properly distribute the data packets.

The DHCP server 450 and the computing device 440, in embodiments, may take the form of various types of computing devices, such as, for example, a personal computer, desktop computer, laptop computer, wireless device, consumer electronic device, handheld device (e.g., personal digital assistant), various servers, a computing cloud, and the like. It should be noted, however, that the invention is not limited to implementation on such computing devices, but may be implemented on any of a variety of different types of computing devices within the scope of embodiments of the present invention.

Further, the DHCP server 450 and the computing device 440, in embodiments, may include memory that is linked to some form of a computing unit (e.g., central processing unit, microprocessor, etc.) to support operations of the components running thereon (e.g., value-selection component 451 or address-assignment component 452). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the DHCP server 450 and the computing device 440 in order to enable each device to perform communication-related processes and other operations (e.g., allocating a value of the IP version field based on one or more criteria). In another instance, the computing unit may encompass a processor coupled to computer-readable media.

Generally, the computer-readable media stores, at least temporarily, a plurality of computer software components, including the components 451 and 452, that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Returning to FIG. 4, the first client device 420 and the second client device 430 represent two devices, of potentially millions of devices, that may be actively communicating with each other across the network 410. By way of example only and not limitation, the client devices 420 and 430 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 410. It should be noted, however, that the invention is not limited to implementation on such computing devices, but may be implemented on any of a variety of different types of computing devices within the scope of embodiments of the present invention.

In an exemplary embodiment of operation, the first client device 420 may become active on the network 410. In some instances, becoming active involves powering up and achieving connectivity with the network 410. Upon becoming active, the first client device 420 may query the DHCP server 450 with a request to provide a network identifier that is unique within the context of the network 410, thereby allowing the computing device 440 to identify a destination of data packets originating from a third-party device that are designated for either the first client device 420 or the second client device 420. Upon detecting the first client device 420 as being active on the network 410, or upon receiving the request from the first client device 420, the DHCP server may dynamically commence a process of assigning a first fractional IP address to the first client device 420. Generally, the first fractional IP address uniquely identifies the first client device 420 within the network 410 while recycling IPv4 addresses that have been previously assigned to other devices, which are active on the network 410, such as the second client device 430. Accordingly, the limited address space associated with IPv4 addresses is expanded through incorporation of IP-version-field values into data-packet headers.

The process of assigning the first fractional IP address to the first client device 420, implemented by the DHCP server 450, may initially involve assigning to the first client device 420 an IPv4 address that has values of the IP version field remaining available for allocation. Typically, there various values associated with the IP version field. These values may include legacy versions IPv0, IPv1, IPv2, and IPv3, current versions IPv4, IPv5, and IPv6, and potential versions IPv7 and up. However, in an exemplary embodiment, the potential versions IPv7 and up are excluded from being allocated to form the fractional IP address due to the possibility that the potential versions may be employed in the future to indicate a new IP version for sending data packets. Further, in an exemplary embodiment, the current versions IPv5 and IPv6 are withdrawn from being available for selection in forming the fractional IP address due to a likelihood that the computing device 440 will be confused as to whether the current version is indicating that the data packets conform with version 5 or version 6 Internet protocol, or whether the current version is simply being used to generate a unique network identifier. As such, the remaining IP-version-field values (IPv0-Ipv4) can be used without the need for future modifications or the potential of confusion, as the computing device 440 can be programmed with logic to view the remaining IP-version-field values as indicating Internet protocol version 4.

These values may be represented as a 4-bit, binary number or may be referenced in any other format that may be employed to address a data packet. By way of example, the value of IPv0 may be 0000, the value of IPv1 may be 0001, the value of IPv2 may be 0010, the value of IPv3 may be 0011, and the value of IPv4 may be 0100. Although a single configuration of the representation of the IP-version-field value has been described, it should be understood and appreciated that other types of suitable formats or representations that can identify one or more values of the IP version field may be used, and that embodiments of the present invention are not limited to those 4-bit, binary representations described herein In addition, those values associated with the IP version field that are currently or previously allocated to a client device on the network 410 are considered to be in use and are not available values. By way of example, the DHCP server 450 is configured to track and record the values associated with both the IP version field and a particular IPv4 address that are in use, and to target those remaining values that are not in use for allocation to the first client device 420. In embodiments, the value-selection component 451 is configured to carry out the steps of determining which IP-version-field values are appropriate to use, ascertaining which of the appropriate IP-version-field values remain available for allocation, and allocating one of the available IP-version-field to a client device. In one instance, the client device may be consistently assigned a particular IP-version-field value each time a request for a network identifier is made therefrom. An association between the client device and its assigned IP-version-field value may be written to the user profile 460. In operation, the user profile 460 may be accessed by the value-selection component 451 upon the value-selection component 451 determining which IP-version-field value to assign to the client device.

Once an IPv4 address associated with one of the available IP-version-field values is allocated to the first client device 420, the address-assignment component 452 assigns a fractional IP address to the first client device 420, where the fractional IP address uniquely identifies the first client device 420 within the network 410. In embodiments, assigning includes communicating the fraction IP address (e.g., the allocated IP-version-field value and an associated IPv4 address) to the first client device 420 and recording the fraction IP address to the ARP table 445, or another memory location. The ARP table 445 is configured to be searchable for fraction IP addresses and the client devices associate therewith, and can store the fraction IP addresses for any duration of time. Although two different components for selecting and assigning IP-version-field values have been described, it should be understood and appreciated that other types of suitable mechanisms that select available IP-version-field values based on other criteria may be used, and that embodiments of the present invention are not limited to the value-selection component 451 and the address-assignment component 452 described herein. For instance, IP-version-field values may be selected based on properties, or functional capabilities, of the client device that is requesting the network identifier.

Once the DHCP server 450 assigns to the first client device 420 the IPv4 address and an IP-version-field value (e.g., utilizing one or more of the components 451 and 452), the resultant fractional IP address is communicated to the first client device 420 and, potentially, stored at the ARP table 445 and/or at another memory location that is accessible to the DHCP server 450 or to the computing device 440. When attempting to communicate across the network 410, the first client device 420 may insert the fractional IP address into a header of IPv4 data packets that are transmitted therefrom. The fractional IP address within the header allows the computing device 440, via the ARP table 445, to identify the sender of the IPv4 data packets as the first client device 420. In addition, the computing device 440 is capable of routing IPv4 data packets 455 to the first client device 420 upon another client device, such as the second client device 430, populating the header of the IPv4 data packets 455 with the fractional IP address assigned to the first client device 420. By way of example, the computing device 440 represents a last router in a hub structure of the network 410 that inspects the IP-version-field value of the fractional IP address to properly route the IPv4 data packets 455 to the first client device 420.

Turning now to FIG. 5, a flow chart is shown that illustrates an exemplary method 500 for assigning network identifiers to client devices in a network, according to embodiments of the present invention. The method 500 includes receiving an indication that a first client device is active in the network, as depicted at block 510. Typically, the network supports transmission of IPv4 packets using wire-line technology, wireless technology, or a combination thereof. The method 500 may further include assigning a first value of an IP version field to the first client device and assigning an IPv4 address to the first client device, as depicted at blocks 520 and 530, respectively. In one embodiment, assigning the first value of the IP version field includes selecting from a plurality of values of the IP version field that are available for assignment, such as one of legacy versions IPv0, IPv1, IPv2, and IPv3, current versions IPv4, IPv5, and IPv6, or potential versions IPv7 and up.

As described more fully above, the first value of the IP version field may be combined with the IPv4 address to form a first fractional IP address. As depicted at block 540, the first fractional IP address may be associated with the first client device. This association can be written to a memory location, such as a routing table, that is accessible by the DHCP server for storage purposes and is available to a router for directing data packets through the network. For instance, when a header of an IPv4 data packet includes the first fractional IP address, the router may refer to the routing table to identify the first client device as the destination of the IPv4 data packet.

With reference to FIG. 6, a flow chart is shown that illustrates an exemplary method 600 for assigning network identifiers to client devices in a network, according to embodiments of the present invention. The method 600 includes assigning a first value of an IP version field to a first client device and a second value of the IP version field to a second client device, as depicted at block 610. As depicted at block 620, the method 600 may further include assigning an IPv4 address to the first client device and to the second client device. Typically, the first value of the IP version field, in conjunction with the IPv4 address, forms a first fractional IP address, while the second value of the IP version field, in conjunction with the IPv4 address, forms a second fractional IP address. Upon reading the first fractional IP address incorporated in a header of an IPv4 data packet, a router, the DHCP server, or another device may be configured to route the IPv4 data packet to a first destination, such as the first client device, as depicted at block 630. In addition, upon reading the second fractional IP address incorporated in a header of an IPv4 data packet, the router, the DHCP server, or another device may be configured to route the IPv4 data packet to a second destination, such as the second client device, as depicted at block 640. Accordingly, an individual IPv4 address can be expanded to uniquely identify, within the context of the network, multiple client devices.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computerized method for assigning network identifiers to client devices in a network, the method comprising:
   receiving an indication that a first client device is active in the network, wherein the network supports transmission of IPv4 packets;
   assigning a first value of an IP version field to the first client device;
   assigning an IPv4 address to the first client device, wherein the first value of the IP version field combined with the IPv4 address forms a first fractional IP address;
   associating the first fractional IP address with the first client device;
   receiving an indication that a second client device is active in the network;
   assigning a second value of the IP version field to the second client device, assigning the IPv4 address to the second client device, wherein the second value of the IP version field combined with the IPv4 address forms a second fractional IP address;

associating the second fractional IP address with the second client device;

wherein each of the first value and the second value of the IP version field is allocated for assignment from a plurality of values of the IP version field, and the first value and the second value each indicates one version of IPv0, IPv1, IPv2, IPv3, or IPv4, and the second value is not the same as the first value wherein each of the first value and the second value of the IP version field is a binary number.

2. The method of claim 1, wherein an IPv4 data packet with a header that includes the first fractional IP address is routed to a first destination.

3. The method of claim 1, wherein an IPv4 data packet with a header that includes the second fractional IP address is routed to a second destination.

4. The method of claim 1, wherein assigning a first value of an IP version field to the first client device further comprises dynamically assigning the first value of the IP version field incident to a dynamic host configuration protocol (DHCP) server receiving the indication that the first client device is active in the network.

5. The method of claim 1, wherein assigning a second value of an IP version field to the second client device further comprises dynamically assigning the second value of the IP version field incident to a DHCP server receiving the indication that the second client device is active in the network.

6. The method of claim 1, wherein each of the first value and the second value of the IP version field comprises four bits.

7. The method of claim 1, wherein the header of the IPv4 data packet that includes the first fractional IP address also includes non-version fields with values entered therein, and wherein the values in the non-version fields are utilized to route the first fractional IP address to the first destination.

8. The method of claim 7, wherein the header of the IPv4 data packet that includes the second fractional IP address also includes non-version fields with values entered therein, and wherein the values in the non-version fields are utilized to route the second fractional IP address to the second destination.

9. The method of claim 8, wherein each of the values in the non-version fields in the header of the IPv4 data packet that includes the first fractional IP address matches each of the values in the non-version fields in the header of the IPv4 data packet that includes the second fractional IP address, respectively.

10. A computer system for assigning network identifiers to client devices that are active in a network, the system comprising:

a first client device that is active in the network;
a second client device that is active in the network; and
a dynamic host configuration protocol (DHCP) server that allocates a first fractional IP address including an IPv4 address and a first value of an IP version field, and that assigns the first fractional IP address to the first client device, wherein the second client device incorporates the first fractional IP address within a header of a first IPv4 data packet and transmits the first IPv4 data packet over the network, and wherein the first client device is identified as a destination of the first IPv4 data packet as a function of the first fractional IP address carried therein, wherein the DHCP server allocates a second fractional IP address that includes the IPv4 address and a second value of the IP version field, and assigns the second fractional IF' address to the second client device;

wherein each of the first value and the second value of the IP version field is allocated for assignment from a plurality of values of the IP version field, and the first value and the second value each indicates one version of IPv0, IPv1, IPv2, IPv3, or IPv4, and the second value is not the same as the first value wherein each of the first value and the second value of the IP version field is a binary number.

11. The computer system of claim 10, wherein the first client device incorporates the second fractional IP address within a header of a second IPv4 data packet and transmits the second IPv4 data packet over the network, wherein the second client device is identified as a destination of the second IPv4 data packet as a function of the second fractional IP address carried therein.

12. The computer system of claim 11, wherein the DHCP server dynamically assigns the first fractional IP address to the first client device and the second fractional IP address to the second client device upon detecting that the first client device and the second client device, respectively, are active in the network.

13. The computer system of claim 12, further comprising a computing device that examines an address resolution protocol (ARP) table to direct transmission of data packets that have the first fractional IP address within a header to the first client device, and to direct transmission of data packets that have the second fractional IP address within a header to the second client device, wherein the ARP table temporarily stores the first fractional IP address and the second fractional IP address.

14. One or more non-transitory computer-readable media having computer-executable instructions embodied thereon that, when executed, perform a method for assigning network identifiers to client devices, the method comprising:

assigning a first value of an IP version field to a first client device and a second value of the IP version field to a second client device;

assigning an IPv4 address to the first client device and to the second client device, wherein the first value of the IP version field combined with the IPv4 address forms a first fractional IP address, and wherein the second value of the IP version field combined with the IPv4 address forms a second fractional IP address, wherein the header of the IPv4 data packet that includes the first fractional IP address also includes non-version fields with values entered therein, and wherein the values in the non-version fields are utilized to route the first fractional IP address to the first destination, wherein the header of the IPv4 data packet that includes the second fractional IF' address also includes non-version fields with values entered therein, and wherein the values in the non-version fields are utilized to route the second fractional IP address to the second destination, and wherein each of the values in the non-version fields in the header of the IPv4 data packet that includes the first fractional IP address matches each of the values in the non-version fields in the header of the IPv4 data packet that includes the second fractional IP address, respectively; and the second value is not the same as the first value wherein each of the first value and the second value of the IP version field is a binary number.

* * * * *